United States Patent
Yau et al.

(10) Patent No.: US 12,346,481 B2
(45) Date of Patent: Jul. 1, 2025

(54) SYSTEMS AND METHODS FOR IMAGE ENCRYPTION

(71) Applicant: Xailient, Sydney (AU)

(72) Inventors: Herman Yau, Sydney (AU); Lars Oleson, Bondi (AU); Andy Atkinson, Sydney (AU); Mallika Patel, Sydney (AU)

(73) Assignee: Xailient, Sydney (AU)

( * ) Notice: Subject to any disclaimer, the term of this patent is extended or adjusted under 35 U.S.C. 154(b) by 0 days.

(21) Appl. No.: 18/406,488

(22) Filed: Jan. 8, 2024

(65) Prior Publication Data
US 2024/0232431 A1 Jul. 11, 2024

Related U.S. Application Data

(60) Provisional application No. 63/479,095, filed on Jan. 9, 2023.

(51) Int. Cl.
| | |
|---|---|
| *G06F 21/62* | (2013.01) |
| *G06V 40/16* | (2022.01) |
| *H04L 9/08* | (2006.01) |

(52) U.S. Cl.
CPC ........ *G06F 21/6254* (2013.01); *G06V 40/161* (2022.01); *H04L 9/0894* (2013.01)

(58) Field of Classification Search
CPC .. G06F 21/6254; G06V 40/161; H04L 9/0894
USPC ......................................................... 726/26
See application file for complete search history.

(56) References Cited

U.S. PATENT DOCUMENTS

| | | | |
|---|---|---|---|
| 6,823,070 B1 | 11/2004 | Smith et al. | |
| 8,306,221 B2* | 11/2012 | Takahashi | H04N 1/4486 380/54 |
| 11,277,557 B1* | 3/2022 | Vemury | G06V 10/25 |
| 11,450,104 B1* | 9/2022 | Mittal | G06V 40/10 |
| 2002/0183985 A1* | 12/2002 | Hori | G06F 21/445 703/1 |

(Continued)

FOREIGN PATENT DOCUMENTS

| | | | | |
|---|---|---|---|---|
| CN | 111931145 A | * | 11/2020 | |
| CN | 108230219 B | * | 10/2021 | ........... G06T 1/0021 |

(Continued)

OTHER PUBLICATIONS

McPherson, Richard, Reza Shokri, and Vitaly Shmatikov. "Defeating image obfuscation with deep learning." arXiv preprint arXiv:1609.00408 (2016). (Year: 2016).*

(Continued)

*Primary Examiner* — Luu T Pham
*Assistant Examiner* — Walter J Malinowski
(74) *Attorney, Agent, or Firm* — Goodwin Procter LLP

(57) ABSTRACT

In an aspect, a system for image redaction is presented. The system includes an image recording device configured to generate image data. A computing device is in communication with the image recording device. The computing device is configured to detect a face in the image data as a function of a facial recognition process. The computing device is configured to modify the image data. Modifying the image data includes reversibly obscuring a face crop from a remaining portion of the image data. The computing device is configured to communicate the modified image data to another computing device.

16 Claims, 6 Drawing Sheets

(56) References Cited

U.S. PATENT DOCUMENTS

| | | | |
|---|---|---|---|
| 2004/0190714 A1* | 9/2004 | Masui | H04L 9/0866 380/43 |
| 2009/0254530 A1* | 10/2009 | Jaffe | H04N 19/467 |
| 2009/0259838 A1* | 10/2009 | Lin | H04L 9/3215 713/150 |
| 2010/0091337 A1* | 4/2010 | Yoshio | H04N 1/444 382/100 |
| 2012/0250951 A1 | 10/2012 | Chen | |
| 2013/0162817 A1 | 6/2013 | Bernal | |
| 2013/0179690 A1* | 7/2013 | Wu | H04N 1/32272 713/176 |
| 2014/0157001 A1* | 6/2014 | Buer | G06F 21/572 713/189 |
| 2015/0022666 A1* | 1/2015 | Kay | H04L 65/65 348/159 |
| 2015/0106623 A1* | 4/2015 | Holman | H04W 12/33 713/171 |
| 2015/0373089 A1* | 12/2015 | Koss | H04W 12/08 709/205 |
| 2016/0014133 A1* | 1/2016 | Kanga | G06V 20/46 726/4 |
| 2017/0147828 A1* | 5/2017 | Kurian | G06F 21/604 |
| 2017/0372046 A1* | 12/2017 | Thomee | H04L 63/0442 |
| 2018/0046814 A1* | 2/2018 | Manoharan | G06F 21/6209 |
| 2018/0165466 A1* | 6/2018 | Rad | H04N 19/154 |
| 2018/0189505 A1 | 7/2018 | Ghafourifar et al. | |
| 2019/0238795 A1* | 8/2019 | Chen | H04N 7/1675 |
| 2020/0082092 A1* | 3/2020 | Areno | H04L 9/0897 |
| 2020/0222949 A1* | 7/2020 | Murad | G06N 3/047 |
| 2020/0287716 A1* | 9/2020 | Zitlaw | H04L 9/14 |
| 2021/0004486 A1* | 1/2021 | Adams | H04W 4/40 |
| 2021/0150721 A1* | 5/2021 | Yohanandan | G06N 3/045 |
| 2021/0195055 A1* | 6/2021 | Sardesai | H04N 1/32283 |
| 2021/0286865 A1* | 9/2021 | Prakash | G06V 40/172 |
| 2021/0287332 A1* | 9/2021 | Gayatri | G06T 3/18 |
| 2021/0374387 A1* | 12/2021 | Whitelaw | G06T 7/194 |
| 2021/0383100 A1* | 12/2021 | Dahlkamp | G06F 21/602 |
| 2021/0390663 A1* | 12/2021 | Kanga | G06F 21/6245 |
| 2022/0109666 A1* | 4/2022 | Collier | H04L 9/3226 |
| 2022/0129582 A1* | 4/2022 | Lange | G10L 21/0232 |
| 2022/0366727 A1* | 11/2022 | Gupta | G06V 20/52 |
| 2023/0004666 A1* | 1/2023 | Beagle | H04L 67/12 |
| 2023/0013117 A1* | 1/2023 | Gupta | G06V 40/172 |
| 2023/0136234 A1* | 5/2023 | Ihara | G06F 21/32 713/186 |
| 2023/0224569 A1* | 7/2023 | Vemury | H04N 5/272 726/26 |
| 2024/0048839 A1* | 2/2024 | Pujari | H04N 23/80 |
| 2024/0056819 A1* | 2/2024 | Arslan | H04L 1/0003 |

FOREIGN PATENT DOCUMENTS

| | | | | |
|---|---|---|---|---|
| JP | 2001209580 A | * | 8/2001 | |
| JP | 2005229265 A | * | 8/2005 | |
| JP | 4686805 B2 | * | 5/2011 | |
| JP | 6671627 B2 | * | 3/2020 | |
| JP | 2021012597 A | * | 2/2021 | |
| JP | 2022085148 A | * | 6/2022 | |
| KR | 101760095 B1 | * | 8/2017 | |
| WO | WO-2010065256 A2 | * | 6/2010 | G06F 17/30176 |
| WO | WO-2012001947 A1 | * | 1/2012 | H04N 5/23219 |
| WO | WO-2019173562 A1 | * | 9/2019 | G06F 18/256 |
| WO | WO-2023157695 A1 | * | 8/2023 | |
| WO | WO-2024068039 A1 | * | 4/2024 | |

OTHER PUBLICATIONS

Magfirawaty. "Principal component analysis and data encryption model for face recognition system." In 2022 2nd International Conference on Electronic and Electrical Engineering and Intelligent System (ICE3IS), pp. 381-386. IEEE, 2022. (Year: 2022).*

Thampi, Sabu M. "Information hiding techniques: a tutorial review." arXiv preprint arXiv:0802.3746 (2008). (Year: 2008).*

Angel, Nuthalapati Pauline, J. A. M. Rexie, and M. Mythily. "Security Key-Based Steganography for Images." In 2023 Second International Conference on Electrical, Electronics, Information and Communication Technologies (ICEEICT), pp. 1-7. IEEE, 2023. (Year: 2023).*

Szegedy et al. 2015 "Going deeper with convolutions," 2015 IEEE Conference on Computer Vision and Pattern Recognition, IEEE 9 pages.

Chao et al. 2018 "Fast object classification method based on saliency detection," 2018 11th International Symposium on Computational Intelligence and Design, IEEE, 1:374-377.

Yohanandan et al. 2018 "Saliency Preservation in Low-Resolution Grayscale Images," 237-254, XP047635328.

Kavasidis et al. 2018 "A Saliency-based Convolutional Neural Network for Table and Chart Detection in Digitized Documents," Arxiv.org, Cornell University Library, 13 pages.

Wang et al. 2018 "Video Salient Object Detection via Fully Convolutional Networks," IEEE Transactions on Image Processing, 27(1):38-49.

PCT/US2024/010671—International Search Report and Written Opinion, Jul. 3, 2024, 8 pages.

EP20890376.5—Supplemental European Search Report, Jul. 26, 2023, 12 pages.

* cited by examiner

SYSTEMS AND METHODS FOR IMAGE ENCRYPTION

CROSS-REFERENCE TO RELATED APPLICATIONS

This application claims priority to, and the benefit of, U.S. Provisional App. No. 63/479,095, filed Jan. 9, 2023, the entirety of which is incorporated herein by reference.

TECHNICAL FIELD

The following disclosure is directed to systems and methods for image capture, storage, modification and identification. In particular, the present disclosure is directed to systems and methods for image encryption.

BACKGROUND

Modern camera security systems pose a privacy concern as video and/or images taken of individuals may be freely accessed and distributed. Accordingly, systems and methods for security systems can be improved to implement enhanced privacy and security features.

SUMMARY OF THE INVENTION

In one aspect, a system for image redaction includes an image recording device configured to generate image data. A computing device is in communication with the image recording device and is configured to receive the image data from the image recording device, detect a face in the image data as a function of a facial recognition process and modify the image data. Modifying the image data includes cropping the image data to a face to generate a face crop, encrypting the face crop using an encryption process, wherein keys of the encryption process are unique to both the face crop and the image recording device. Modifying the image data also includes reversibly obscuring the face crop from a remaining portion of the image data. The computing device is configured to communicate the modified image data to another computing device.

In another aspect, a method of implementing an image redaction process includes generating image data through an image recording device, receiving the image data at a computing device, and detecting a face in the image data at the computing device as a function of a facial recognition process. The method also includes modifying the image data to generate modified image data at the computing device. Modifying the image data includes cropping the image data to the face to generate a face crop, encrypting the face crop, and reversibly obscuring the face crop from a remaining portion of the image data. The method also communicating, at the computing device, the modified image data to another computing device.

These and other aspects and features of non-limiting embodiments of the present invention will become apparent to those skilled in the art upon review of the following description of specific non-limiting embodiments of the invention in conjunction with the accompanying drawings.

DETAILED DESCRIPTION

At a high level, aspects of the present disclosure are directed to image redaction of image data generated from an image recording device. Aspects of the present disclosure can be used to provide a layer of security for faces detected in image data through improved encryption techniques. Aspects of the present disclosure can also be used to generate an audit record of access to one or more videos or images linked to one or more individuals.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
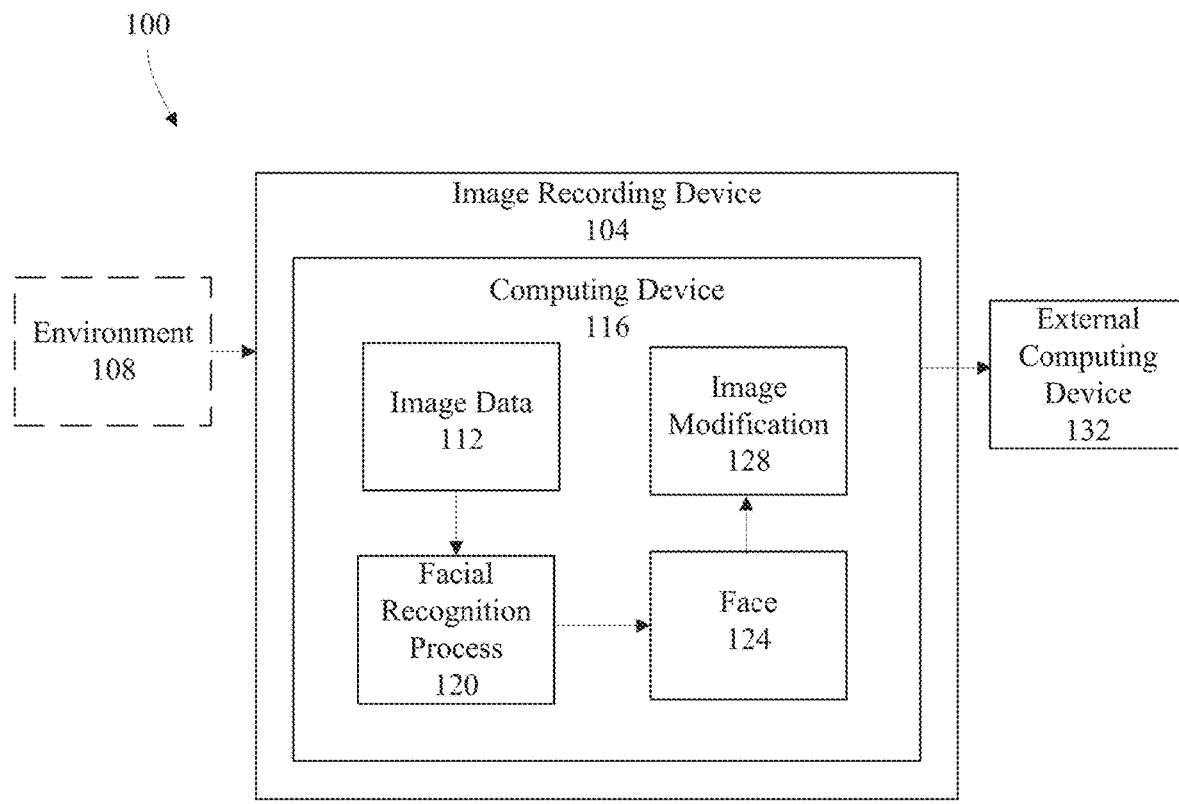
FIG. 1 is a block diagram of an exemplary embodiment of a system for image redaction.

Referring to FIG. 1, system 100 for image redaction is presented. System 100 may include image recording device 104. An "image recording device" as used in this disclosure is an object capable of recording photographic data. Image recording device 104 may include, but is not limited to, a camera, such as a security camera, surveillance camera, smartphone camera, and/or other camera. Image recording device 104 may include a power supply, such as a battery, wired, wireless, or other power supply. Image recording device 104 may be configured to generate image data 112 from an environment 108 in which the device 104 is placed. Environment 108 may include an immediate, adjacent, and/or other surrounding of image recording device 104. For instance and without limitation, image recording device 104 may be placed at a door of a building, in which environment 108 may include an area in front of the door. "Image data" as used in this disclosure is information pertaining to photographs and/or videos, including individual or a series of frames selected from a video. Image data 112 may include one or more pixels. A "pixel" as used in this disclosure is a smallest addressable element in a raster image. Image data 112 may include, without limitation, raster formats such as JPE, Exif, TIFF, GIF, BMP, and the like. Image data 112 may include vector formats, such as, without limitation, CGM, SVG, DXF, and/or other formats. Image recording device 104 may generate image data 112 in a JPEG format, with individual pixel values for each pixel. Pixels of image data 112 may include one or more pixel values, such as, without limitation, RGB values, YUV values, and/or other values. In some embodiments, pixel values may include a color space value, such as, but not limited to, red, green, blue, luma, chrominance, depth, and the like. Image recording device 104 may generate image data 112 in an SVG format with individual XML element, such as, without limitation, vector graphic shapes, bitmap images, text, and the like.

Still referring to FIG. 1, image data 112 may include one or more pixel groups. A pixel group may include two or more pixels that may combine to make up a larger singular pixel. A number of pixels in a pixel group may be referred to herein as a "resolution", without limitation. Resolutions of image data 112 may include, but are not limited to, 640×480 (Standard Definition), 1280×720 (High Definition), 1920×1080 (Full High Definition), 2560×1440 (Quad High Definition), 2048×1080 (2K), 3840×2160 (4K), and/or 7680×4320 (8K). Image data 112 may include a number of bits per pixel (bpp). For instance, a 1 bpp image may use 1 bit for each pixel, such that each pixel may be on or off. Continuing this example, each additional bit may double a number of colors available, such as a 2bpp image having 4 colors, a 3 bpp image having 8 colors, a 4bpp image having 16 colors, and the like. Image data 112 may include a bpp value of anywhere between about 1 bpp to 24 bpp. Further image recording device 104 may include an image sensing device capable of sensing one or more megapixels, such as, without limitation, 4 megapixels, 10 megapixels, 16 megapixels, 24 megapixels, 64 megapixels, and the like.

Still referring to FIG. 1, image recording device 104 may be in communication with and/or include computing device 116. Computing device 116 may include a processor, memory, and the like. Computing device 116 may include any computing device as described in this disclosure, including without limitation a microcontroller, microprocessor, digital signal processor (DSP) and/or system on a chip (SoC) as described in this disclosure. Computing device 116 may include, be included in, and/or communicate with a mobile device such as a mobile telephone or smartphone. Computing device 116 may include a single computing device operating independently, or may include two or more computing device operating in concert, in parallel, sequentially or the like. Two or more computing devices may be included together in a single computing device or in two or more computing devices. Computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 116 may include but is not limited to, for example, a computing device or cluster of computing devices in a first location and a second computing device or cluster of computing devices in a second location. Computing device 116 may include one or more computing devices dedicated to data storage, security, distribution of traffic for load balancing, and the like. Computing device 116 may distribute one or more computing tasks as described below across a plurality of computing devices of computing device, which may operate in parallel, in series, redundantly, or in any other manner used for distribution of tasks or memory between computing devices. Computing device 116 may be implemented using a "shared nothing" architecture in which data is cached at the worker, in an embodiment, this may enable scalability of computing device 116 and/or another computing device.

With continued reference to FIG. 1, computing device 116, and/or any other computing device as described throughout this disclosure, may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 116 may receive image data 112 from image recording device 104. In embodiments where computing device 116 may be part of image recording device 104, image data 112 may be transmitted through a wired connection. In other embodiments, image data 112 may be transmitted over a wireless connection. Computing device 116 may be configured to perform facial recognition process 120 on image data 112. A "facial recognition process" as used in this disclosure is a computer function that detects one or more faces. Facial recognition process 120 may include a machine learning process. A "machine learning process" as used in this disclosure is one or more computer algorithms that are trained with training data to output a certain element given an input. Machine learning processes may include, but are not limited to, supervised machine learning processes, unsupervised machine learning processes, and the like. Facial recognition process 120 may employ one or more neural networks. A neural network may include a set of one or more nodes. For example, a neural network, also known as an artificial neural network, is a network of "nodes," or data structures having one or more inputs, one or more outputs, and a function determining outputs based on inputs. Such nodes may be organized in a network, such as without limitation a convolutional neural network (CNN), including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 1, a node may include, without limitation a plurality of inputs that may receive numerical values from inputs to a neural network containing the node and/or from other nodes. A node may perform a weighted sum of inputs using weights that are multiplied by respective inputs. Additionally or alternatively, a bias may be added to the weighted sum of the inputs such that an offset is added to each unit in the neural network layer that is independent of the input to the layer. The weighted sum may then be input into a function, which may generate one or more outputs. Weights applied to an input may indicate whether the input is "excitatory," indicating that it has strong influence on one or more outputs, for instance by the corresponding weight having a large numerical value. Weights applied may indicate whether the input is "inhibitory," indicating it has a weak influence on the one more inputs, for instance by the corresponding weight having a small numerical value. The values of weights may be determined by training a neural network using training data, which may be performed using any suitable process as described above. In an embodiment, and without limitation, a neural network may receive semantic units as inputs and output vectors representing such semantic units according to weights that are derived using machine-learning processes as described in this disclosure.

Still referring to FIG. 1, facial recognition process 120 may utilize one or more sets of training data. "Training data" as used in this disclosure is data containing correlations that a machine-learning process may use to model relationships between two or more categories of data elements. In certain implementations, different individual datasets may be created and maintained that are specific to a particular domain—e.g., a training dataset may be developed and used to process images for reading license plates, another dataset for facial detection and recognition, and yet another for object detection used in an autonomous driving context. By using domain-specific training datasets as the basis for subsequent network processing, the processing and power efficiencies of the system are optimized, allowing processing to occur on "edge" devices (internet of things devices, mobile phones, automobiles, security cameras, etc.) without compromising accuracy.

With continued reference to FIG. 1, in some embodiments, a training dataset may be created through identifying a first set of images for a particular domain (e.g., frames from a multitude of surveillance cameras at an airport). A specific property, such as "does this image include a face" may be selected as a property of interest. In some cases, the same set of images may be used to create multiple training datasets, using a different property of interest. A user may label the pixels (or sets of pixels) as either "interesting" or "uninteresting" creating an array describing the image with respect to the property of interest. In some cases, labeling may be done using automated processes such as supervised or semi-supervised artificial intelligence. This may, for example, take the form of an array label of 1's and 0's, with 1's representing pixels of interest (e.g., these pixels represent a face) and 0's representing pixels that are not of interest (e.g., background, etc.).

Still referring to FIG. 1, in some cases, pixels of image data 112 may be grouped and represented as a plurality of different channels within an image, effectively decomposing the image into a set of composite images such that each channel may be individually processed. This approach may be beneficial when an image includes multiple different areas of interest (e.g., more than one image of a person, or an image with different objects along a street scene), and the different channels are processed using different networks. In other cases, an image of image data 112 may be processed as a single channel. In various examples, training of an object detection and classification system can be achieved using either single or multi-step processes, without limitation. In some examples, facial recognition process 120 may be trained using stochastic gradient descent and back-propagation. For example, a set of initial starting parameters are identified, which may be further refined using the training images and output a convolutional feature map with trained proposals in an iterative process.

Continuing to refer to FIG. 1, in various examples, facial recognition process 120 may be trained using a single-step process using back-propagation. For instance, a machine learning module of facial recognition process 120 may initialize an initial processing module, an object proposal module and an object classifier module with starting parameters. After initialization, a machine learning module of facial recognition process 120 can process a training image through an initial processing module, an object proposal module, and an object classifier module. Using back-propagation, a machine learning module of facial recognition process 120 can score the output proposals, classifications, and confidence scores based on data corresponding to the training image. A machine learning module can train parameters in an initial processing module, an object proposal module, and an object classifier module, in order to improve the accuracy of the output object classifications and confidence scores. In various examples, a machine learning process can train the facial recognition process 120 in an initial set-up. In other examples, a machine learning process can train facial recognition process 120 periodically, such as, for example, at a specified time each week or month, or when the amount of new data (e.g., new images) reaches a threshold. For example, new images may be retrieved from edge devices over time (either continuously while connected to a centralized cloud-based system or asynchronously when such connections and/or the requisite bandwidth are available). In some examples, a machine learning process may receive updated images for subsequent training when manually collected by a user. In some instances, collection rules may be defined by a user or be provided with facial recognition process 120 itself, or in yet other cases, automatically generated based on user-defined goals. For example, a user may determine that a particular object type is more interesting than others, and as such when facial recognition process 120 recognizes such objects those images are collected and used for further training iterations, whereas other images may be ignored or collected less frequently. In either instance, the subsequent processing of an image may occur on a channel by channel basis (a single channel at a time). As such, images that have been modeled as multiple channels may be converted to a single channel. In one embodiment, a random number between a minimum and maximum pixel value within the pixel group is selected and used as the basis for the conversion.

Still referring to FIG. 1, facial recognition process 120 may include downsampling image data 112 into a value map. Downsampling image data 112 may include grouping two or more pixels into a pixel group. Downsampling may include determining an optimal group size, shape or both of one or more pixels of image data 112. For example, a 4× 6 area of 24 pixels may be combined and analyzed as a single pixel group through facial recognition process 120. A pixel group may be assigned a pixel group value based on the pixel values of each of the two or more pixels associated with the group of pixels. According to one embodiment, two or more pixels may each include pixel values such as red, green, and blue. According to various embodiments, other pixel values may include YUV (e.g., luma values, blue projection values, red projection values), CMYK (e.g., cyan values, magenta values, yellow values, black values), multi-color channels, hyperspectral channels, or any other data associated with digitally recording electromagnetic radiation or assembling a digital image. In some cases, each pixel group's value is determined by determining the pixel value of the pixel values associated with the pixel group. In other instances, the pixel group value may be determined based on an average pixel value, or some other threshold value (e.g., a percentage of the maximum pixel value). The value may be determined as a summary of the image data channels, such as RGB, YUV or other channel. A summary transformation may for example, be the average, maximum, harmonic mean, or other mathematical summary of the values associated with each pixel group. A value map may be generated based on a combination of one or more pixel group values.

With continued reference to FIG. 1, facial recognition process 120 may include processing a value map using a neural network to determine a probability heat map. A probability heat map may include groups of graded values. Graded values may be indicative of a probability that a respective pixel group includes a representation of an object of interest, such as without limitation a face. Facial recognition process 120 may include detecting which groups of graded values meet a determined probability threshold. According to some embodiments, a determined probability threshold may be predetermined by a user. According to further embodiments, a determined probability threshold may be dynamically determined programmatically. Dynamically determining the determined threshold may include various subroutine functions, predetermined rules, or statistical algorithms. For example, dynamic determination may include using curve fit statistical analysis, such as interpolation, smoothing, regression analysis, extrapolation, among many others, to determine the determined probability threshold for that particular image or data set.

Continuing to refer to FIG. 1, according to some embodiments, graded values may include various ranges, including zero (0) to one (1) or zero to one-hundred (100). The graded values may be indicative of the probability that the respective pixel group includes a representation of an object of interest. Groups of graded values that meet the predetermined probability threshold are identified as zones of interest, according to some embodiments. For example, if the predetermined probability threshold is set at 0.5, the groups of graded values greater than or equal to 0.5 (e.g., 0.5-1.0) will be identified as zones of interest. Facial recognition process 120 may include a first neural net and a second neural net. A "first neural net" as used in this disclosure is an initial neural network. A "second neural net" as used in this disclosure is a neural network subsequent to an initial neural network. In some embodiments, a first neural network and/or a second neural network may include a same neural network type. In other embodiments, a first neural network and/or a second neural network may include a differing network type. Neural network types may include, without limitation, feed forward networks, multi-layer perceptron networks, radial based networks, convolutional neural networks, recurrent neural networks, and/or long short term neural network. Facial recognition process 120 may include processing zones of interest to detect objects of interest therein using a second neural network, according to some embodiments. Objects of interest may be defined dynamically by a continuous machine learning process and identified by the application of such machine learning data, according to some embodiments. Other embodiments may define objects of interest using predetermined characteristics and/or classifications that are assigned by an outside entity. A second neural network receives as input image data within the zones of interest. According to some embodiments, the image data may include downscaled representations of the originally received image data or the originally received image data itself or a mosaic combining downscaled representations of the regions of interest of the originally received image. The second neural network generates as output a representation of the objects of interest, according to some embodiments. A representation of the objects of interest may include one or more of the following: a classification for each object of interest and coordinates indicative of the location of each object of interest within the originally received image data. According to some embodiments, facial recognition process 120 may repeat continuously until the process is terminated. For example, facial recognition process 120 may repeat for every new image dataset that is made available to the system.

Still referring to FIG. 1, facial recognition process 120 may detect and/or generate one or more detected faces 124. Face 124 may be a human face. Face 124 may include, without limitation, checks, jawbones, foreheads, noses, eyes, lips, mouths, teeth, hair, and/or other elements of a human head. Face 124 may include a portion of image data 112 that illustrates a part and/or whole of a human face. Face 124 may include a side-profile view, front-profile view, and/or a combination thereof of one or more human faces. According to some embodiments, facial recognition process 120 may further detect and/or generate face descriptions of face 124. Face descriptions may include, without limitation, "man", "woman", "old", "young", "middle aged", "Caucasian", "African American", "Asian", "pacific islander", and the like. Facial recognition process 120 may be trained with training data correlating image data to one or more face descriptions. Training data may be received through user input, one or more external computing devices, and/or previous iterations of processing. Facial recognition process 120 may input image data 112 and output faces 124 with corresponding face descriptions based on training with training data correlating image data to one or more face descriptions. Facial recognition process 120 may generate a confidence score of each face description of face 124. A confidence score may include, but is not limited to, a numerical value, percentage, and the like. For instance, and without limitation, a confidence score of face 124 may include a value of 0.95 out of 1, indicating a high confidence in a face description of a middle aged Asian woman. In some embodiments, facial recognition process 120 may associate an identity with one or more faces 124. Facial recognition process 120 may be configured to associate an identity with one or more faces 124 through training with training data correlating images of faces to identities. Training data may be received through user input, external computing devices, and/or previous iterations of processing. An identity may include, but is not limited to, a first name, last name, occupation title, home address, and the like. For instance and without limitation, facial recognition process 120 may output a detected face and a corresponding identity of "John Doe", with a job title of "Back-End Engineer", and an address of "123 Apple St, Boston, MA." Computing device 116 may generate an identity database that may store one or more identities, faces corresponding to identities, and the like. Facial recognition process 120 may receive data from an identity database to further enhance identity recognition, without limitation.

Still referring to FIG. 1, computing device 116 may perform image modification 128 as a function of a detected face 124. "Image modification" as used in this disclosure is a process of altering one or more characteristics or values of the image. In some embodiments, image modification 128 may include cropping and/or rescaling an image. Cropping an image may include changing an aspect ratio, removing areas around areas of interest, and the like. As a non-limiting example, face 124 may be detected in a foreground of a building entrance, where image data 112 of face 124 may include a background of cars, clouds, trees, and/or other elements. Cropping may include removing cars, clouds, trees, and/or other elements from image data 112 to emphasize face 124 of image data 112. Image modification 128 may include cropping an image based on one or more zones of interest detected from facial recognition process 120. In some embodiments, cropping and/or rescaling an image may include combining a representations of zones of interest into one representative dataset. According to some embodiments, representations of zones of interest may include sections of image data 112 in which zones of interest have been identified. Cropping may include eliminating sections of image data 112 that have not been identified as zones of interest, according to some embodiments. Cropping may include cropping two or more faces 124. For instance and without limitation, facial recognition process 120 may detect four faces 124 in various portions of image data 112. Image modification 128 may include cropping and/or rescaling image data 112 to show the four faces 124 in one image. Computing device 116 may generate a face crop image of face 124 through image modification 128. A face crop image of face 124 may include a cropped version of an image showing substantially only a human face 124 of the image. Substantially only including face 124 may include a percentage of an area of an image representing face 124 compared to an area of the image not representing face 124, such as, but not limited to, at least 70%, at least 80%, at least 90% and/or other percentages. In some embodiments, substantially only including face 124 of an image may include a pixel count of pixels representing face 124 higher than that of pixels not representing face 124. For instance and without limitation, an image displaying face 124 may be cropped so that there are 1,000 more pixels representing face 124 than a pixel count representing other non-face parts of the image. A pixel count may be received by user input and/or determined by any machine learning model as described throughout this disclosure, without limitation.

Continuing to refer to FIG. 1, image modification 128 may include encrypting selected image data 112. In some embodiments, image modification 128 may include encrypting one or more crops of faces 124. "Encryption" as used in this disclosure refers to a process of converting information into a code to prevent unauthorized identification or access. Encryption may include a cryptographic system, such as a system that converts data from a first form, which may be known as "plaintext", to a second form, which may be known as "ciphertext". Plaintext may be intelligible when viewed in its intended format. Ciphertext may be unintelligible when viewed in a same way as plaintext. Ciphertext may be unintelligible until converted into plaintext. Encryption may involve a use of a datum, such as an encryption key, to alter plaintext. Cryptographic systems may also convert ciphertext into plaintext, which may be known as "decryption". Decryption may make use of a datum known as a "decryption key" to return the ciphertext to its original plaintext form. One of ordinary skill in the art, upon reading this discourse, will appreciate the many forms encryption may take.

Still referring to FIG. 1, encryption of image data 112 may include converting a portion or an entirety of image data 112 from plaintext into ciphertext. Encryption of image data 112 may include generating one or more decryption keys. In some embodiments, encryption may include a multi-factor authentication encryption method. A "multi-factor authentication" as used in this disclosure is an electronic authentication method utilizing two or more pieces of evidence to grant access. A multi-factor authentication method may utilize factors such as, but not limited to, a security token, password, biometric data, and the like. Encryption of image data 112 may include generating one or more encryption keys that may be unique to both image recording device 104 and face 124. For instance, a first encryption key may include a serial number, model number, and the like of image recording device 104. A second encryption key may include a time-sensitive key code that may change every 60 seconds, 90 seconds, 120 seconds, and the like. A time-sensitive key may provide decryption for a set period of time. For instance, a time-sensitive key may provide access to decrypted data for a minute, 5 minutes, 30 minutes, and the like. An operator attempting to access encrypted image data 112 may need to provide a decryption key unique to image recording device 104 and a decryption key time-sensitive to a specific time period. Providing computing device 116 with two or more decryption keys may grant access to unredacted faces 124 and/or decrypted image data 112, including meta data of image data 112. In some embodiments, an operator may receive one or more decryption keys from a password locker. A "password locker" as used in this disclosure is a database that stores one or more decryption keys. A password locker may be stored online, such as through a cloud-computing network. External computing device 132 may communicate with a password locker through a cloud-computing network.

Still referring to FIG. 1, image modification 128 may include obscuring one or more areas of interest of image data 112, such as crops of faces 124. Obscuring may include redacting crops of faces 124, such as hiding one or more face crops behind a masking element, pixelation, and the like. For instance and without limitation, obscuring face 124 and/or a redaction of face 124 may include placing a black circle over face 124 and/or a cropping of face 124. In other embodiments, obscuring and/or redacting face 124 may include pixelating part or whole of face 124. "Pixelating" as used in this disclosure is a process of altering one or more pixels and/or pixel groups to blur an image. Pixelation may include, without limitation, reducing a resolution of one or more parts of an image, adjusting one or more color values of an image, and the like. Image modification 128 may include reversibly obscuring crops of faces 124. "Reversibly obscuring" as used in this disclosure refers to a process of redacting parts of an image in a reversible manner. For instance and without limitation, face 124 may be obscured with a green circular pixel mask, which may be added on a layer of an image above a layer in which the faces are shown. This process may be reversible by removing the layer displaying the green circular pixel mask. In another non-limiting example, reversibly obscuring face 124 may include applying a blur effect through randomizing one or more pixel values of pixels making up a face. One or more pixel values of an original image of image data 112 may be stored in a database. Original pixel values may be used to revert or otherwise reverse a randomization of one or more pixel values of image data 112. In yet another non-limiting example, randomization and/or redaction of one or more pixels of image data 112 may include altering original pixel values through a randomization process. Computing device 116 may store each pixel value change of image data 112 and apply a reverse pixel value change to restore each pixel value to an original state. One of ordinary skill, upon reading this disclosure, will appreciate the various ways an image may be obscured and/or redacted.

Still referring to FIG. 1, image modification 128 may include embedding crops of face 124 and/or encryption data of crops of face 124 into meta data of image data 112. "Meta data" as used in this disclosure is a set of data that describes another set of data. Meta data of image data 112 may include, without limitation, image recording device 104 details, aperture settings, shutter speed, ISO number, focal depth, dots per inch (DPI), timestamp data, global positioning system (GPS) data, and the like. In some embodiments, meta data may include comments and/or descriptions added to image data 112, such as descriptions of an image creator, keywords related to an image, captions, titles, and the like. Embedding crops of face 124 into meta data of image data 112 may include adding encryption information to the meta data.

Still referring to FIG. 1, computing device 116 may be configured to communicate modified image data to external computing device 132. External computing device 132 may include, without limitation, a laptop, smartphone, tablet, server, cloud-computing network, and the like. An operator of external computing device 132 may request a decryption key or "unlock code" to remove a redaction and/or encryption of image data 112. Computing device 116 may receive a request for decryption, which may include a specific time period for a specific user. Computing device 116 may generate an audit of a request for decryption. An "audit" as used in this disclosure is a record of events. Computing device 116 may generate an audit to include decryption request data. Decryption request data may include a time of a decryption request, a location of external computing device 132, a time period of accessing decrypted image data 112, details of an operator of external computing device 132, and the like.

In some embodiments, computing device 116 may be configured to detect one or more packages, such as packages delivered by mailmen, shipping services, and the like. Computing device 116 may utilize a package detection machine learning model. A package detection machine learning model may be trained with training data correlating images to identified packages within those images. Training data may include one or more images of packages surrounded by a bounding box, packages semantically segmented, and the like. Training data may be received through user input, external computing devices, and/or previous iterations of processing. A package detection machine learning model may be configured to input image data 112 and output a detection of one or more packages within image data 112. A detection of one or more packages within image data 112 may include surrounding one or more packages of image data 112 with a bounding box, semantically segmenting one or more packages within image data 112, and/or other forms of detection. A package detection machine learning model may be trained and/or configured to determine lengths, widths, and the like of one or more packages. In some embodiments, a package detection machine learning model may be trained and/or configured to determine a count of packages. Counts of packages may include between 1 to 20 packages. In some embodiments, counts of packages may be greater than 20 packages. A package detection machine learning model may be trained and/or configured to track a location and/or movement of one or more package. For instance and without limitation, image data 112 may be a real-time recording of a front door of a residential home. A package detection machine learning model may track a movement of one or more packages from a delivery person to a location of the front door of the residential home. A tracking of a movement of one or more packages may include detecting an initial drop off of one or more packages, a movement of one or more packages from an initial drop off to a secondary location within image data 112, a timestamp of when one or more packages leave a view of image data 112, and the like. In some embodiments, a package detection machine learning model may be configured to detect one or more vehicles, types of vehicles, and the like. Training data used to train a package detection machine learning model may include images correlated to vehicle detections. Vehicle detections may include bounding boxes of vehicles, semantic segmentation of vehicles, and the like. A package detection machine learning model may be configured to identify vehicles within image data 112, types of vehicles, movement of vehicles, and the like.

Computing device 116 may detect a delivery person based on face 124 and/or other attributes determined by facial recognition process 120 and/or another machine learning model. For instance and without limitation, facial recognition process 120 may determine a height, race, sex, uniform, and the like of a person. Facial recognition process 120 may be trained with training data correlating one or more images to various attributes of a person, such as, but not limited to, heights, races, sexes, uniforms, and the like. As a non-limiting example, facial recognition process 120 may be operable to determine a uniform of a UPS, Amazon, USPS, FedEx, or other company.

Computing device 116 may combine outputs of a package detection machine learning model and facial recognition process 120 to perform a package detection operation. A package detection operation may include computing device 116, a package detection machine learning model, and/or facial recognition process 120 determining when a package was delivered, who delivered the package, what vehicle the package came from, and the like. For instance, computing device 116 may be configured to generate one or more package delivery alerts. A package delivery alert generated by computing device 116 may include information such as, but not limited to, timestamps of when a vehicle arrived, timestamps of when a package was delivered, images of who delivered the package, images of the vehicle detected, company identifications of the delivery person, and the like. Computing device 116 may compare data from any machine learning model as described throughout this disclosure to determine a package theft alert. A package theft alert may include a notification that one or more packages were stolen. For instance, a user may input an expected stranger detection, expected delivery detection, and the like to computing device 116. An expected stranger detection may include a time frame in which a user expects a stranger to arrive at a location. A stranger of an expected stranger detection may have an unrecognized face 124. An expected delivery detection may include a timeframe in which a user expects a delivery of one or more packages to a location. An expected delivery detection may include a specific delivery company, such as, but not limited to, Amazon, UPS, USPS, FedEx, and the like. In some embodiments, computing device 116 may communicate with one or more application programming interfaces (APIs) of one or more delivery services a user may use to automatically determine expected stranger and/or package detections. For instance and without limitation, a user may provide user credentials for one or more delivery services to computing device 116, to which computing device 116 may access information of deliveries of one or more delivery services.

With continued reference to FIG. 1, computing device 116 may compare data such as, but not limited to, expected stranger detections, expected package deliveries, vehicle identifications, uniforms of a delivery person, times of day, package delivery notifications, and the like, to determine a package theft alert. In some embodiments, computing device 116 may utilize a suspicion model to determine a package theft alert. A suspicion model may be a machine learning model that may input data such as expected stranger detections, expected package deliveries, vehicle identifications, uniforms of a delivery person, times of day, package delivery notifications, and the like and output a package theft alert. For instance and without limitation, a suspicion model may compare a recent vehicle detection and/or vehicle recognition with a uniform of a delivery person and/or a time of day the delivery person was detected. Each variable in a suspicion model may have a weight attribute to it. In some embodiments, weights may be received from user input. In other embodiments, through iterations of processing, a suspicion model may assign weights to one or more variables. Weights may be represented as a value out of 100, a value out of 1, and the like. As a non-limiting example, a weight of 0.7 may be assigned to a time of day variable and a weight of 0.3 may be assigned to an expected stranger detection vehicle. One or ordinary skill in the art, upon reading this disclosure, will understand the many different weights that may be assigned to each variable.

A suspicion model may be configured to compare each variable to one or more suspicion thresholds. A suspicion threshold may include a value that if surpassed designates a variable as suspicious. A suspicion threshold may be variable specific. For instance and without limitation, a suspicion threshold for a time of day may be lower than a suspicion threshold for a type of vehicle. A suspicion model may assign a percentage value of suspicion to one or more variables, such as a value between about 1% to about 100%. As a non-limiting example, a detection of a stranger at 10:30 P.M. may be assigned a suspicion percentage value of 80% while a detection of a movement of a package from one location to another may have a suspicion percentage value of about 15%. A suspicion model may combine one or more suspicion percentages of one or more variables to determine a probability of a package theft. In some embodiments, a suspicion model may output a probability of a package theft, such as between about 1% to about 100%. A suspicion model may generate a package theft alert if a probability of a package theft reaches a certain percentage value, such as, but not limited to, about 70%. In some embodiments, a user may set a probability percentage value as a threshold value for a suspicion model to generate a package theft alert. A package theft alert may include a timestamp of when a suspected theft occurred, highlighted suspects in image data 112, highlighted packages in image data 112, if a uniform was detected, what type of uniform was detected, which way a suspect moved with the package, and the like. As a non-limiting example, a package theft alert may notify a user that an unrecognized person was detected at 2:04 A.M., no uniform was detected, a vehicle was detected and unrecognized, and a package previously dropped off at 1:24 P.M. was moved from a left side of a recording of image data 112 to a right side of the recording of image data 112 and then off screen of image data 112.

Figure 2:
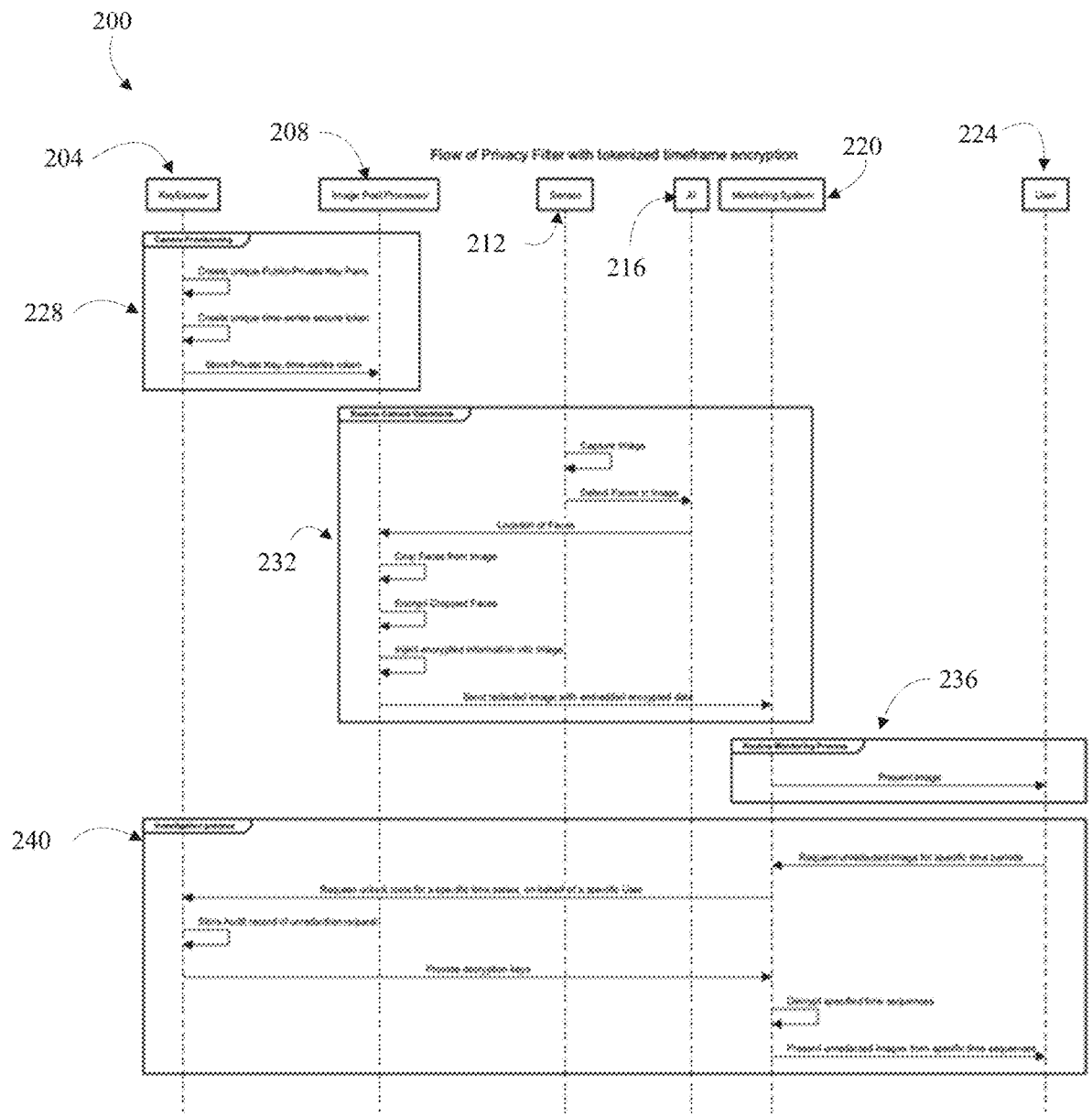
FIG. 2 illustrates an exemplary embodiment of a system for image redaction.

Referring to FIG. 2, an exemplary embodiment of a system 200 for image encryption is presented. System 200 may include key escrow 204, which may include a password locker as described above with reference to FIG. 1. Key escrow 204 may include one or more decryption keys, which may include time-sensitive keys, keys unique to an image recording device, and the like. System 200 may include an image post-processor 208. Image post-processor 208 may implement image modification 128 as described above with reference to FIG. 1. Image post-processor 208 may crop, redact, rescale, and/or modify an image through other means. System 200 may include sensor 212. Sensor 212 may include an image sensing device, such as a camera. Sensor 212 may include, but is not limited to, charge-coupled devices (CCD), active-pixel sensors (CMOS), and the like. In some embodiments, sensor 212 may include a full color sensor, monochrome sensor, infrared sensor, depth sensor, and/or other sensing device that may capture image data. System 200 may include AI (artificial intelligence) 216 process(es) such as the machine learning processes as described throughout this disclosure. AI 216 may be configured to detect faces in images captured from sensor 212, and in some cases may be configured to crop, rescale, and/or otherwise modify image data captured from sensor 212. For instance, AI 216 may detect one or more faces from an image captured through sensor 212 and crop the image to remove areas around the one or more faces. System 200 may also include monitoring system 220, which may be implemented as a computer program or other function that detects communications between user 224 and one or more other parts of system 200.

Still referring to FIG. 2, system 200 may include camera provisioning 228 which may include one or more steps of initializing system 200. For instance, camera provisioning 228 may include creating one or more unique public-private key pairs. Camera provisioning 228 may also include creating a unique time-series secure token, such as a time-sensitive token as described above with reference to FIG. 1. Camera provisioning 228 may include storing a private key and/or time-series token in key escrow 204 and/or in image post processor 208.

With continued reference to FIG. 2, system 200 may include camera operations 232. Camera operations 232 may include capturing one or more images with sensor 212. Camera operations 232 may include detecting on or more faces in an image captured from sensor 212 through AI 216. AI 216 may provide a location of one or more detected faces to image post processor 208. Image post processor 208 may receive a location of one or more faces from AI 216 and perform one or more functions on an image captured from sensor 212. In some cases, image post processor 208 may crop one or more faces from an image. Image post-processor 208 may encrypt one or more cropped faces from an image. Encryption may include converting image data into ciphertext from an original plaintext format. Image post-processor 208 may embed and/or inject encrypted data, such as encrypted cropped image face data, into image data of an image. For instance, image post-processor 208 may embed encrypted cropped face data into meta data of an image.

Image post-processor 208 may communicate and/or send a redacted image with embedded encryption data to monitoring system 220.

Still referring to FIG. 2, system 200 may include monitoring process 236. Monitoring process 236 may include one or more computer programs and/or functions such as receiving a redacted image with embedded encrypted data from routine camera operations 232 through monitoring system 220 and communicating the image with user 224. User 224 may communicate with monitoring process 236 through an external computing device in communication with monitoring system 220, such as, without limitation, a laptop, smartphone, tablet, desktop, server, and the like.

With continued reference to FIG. 2, system 200 may include interrogation process 240. Interrogation process 240 may include one or more computer programs and/or functions. Interrogation process 240 may include receiving a request for an unredacted image for a specific time period from user 224. As a non-limiting example, user 224 may request an unredacted image for a time period of 11:00 AM to 11:15 AM. A request for unredacted images may be sent from user 224 to monitoring system 220. Monitoring system 220 may communicate with key escrow 204. Monitoring system 220 may request an unlock code, or decryption key, for a specific time period on behalf of a specific user, such as user 224. Key escrow 204 may store an audit record of an unredaction request from user 224. Key escrow 204 may communicate one or more decryption keys to monitoring system 220. Monitoring system 220 may decrypt an image for a specific time sequence, such as 60 seconds, without limitation. Monitoring system 220 may communicate a decrypted image file to user 224 for a specific time sequence, such as 60 seconds.

Figure 3:
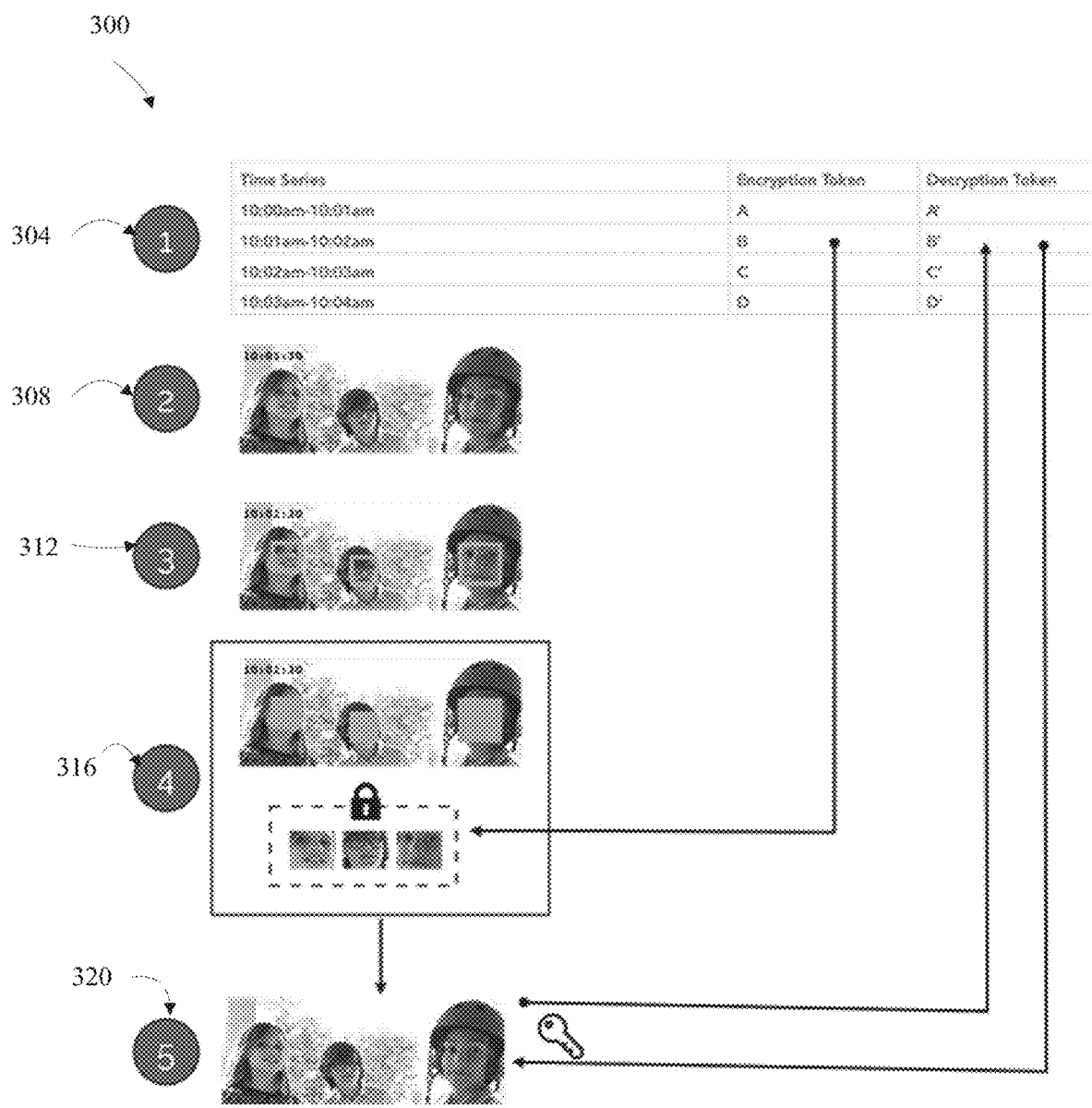
FIG. 3 illustrates a flowchart of an exemplary embodiment of image redaction.

Referring to FIG. 3, a method 300 of image redaction is presented. At step 305, method 300 includes generating time-series tokens. For instance, time-series tokens may include a first token "A" which may be valid from 10:00 AM to 10:01 AM, a second token "B" which may be valid from 10:01 AM to 10:02 AM, a third token "C" which may be valid from 10:02 AM to 10:03 AM, and a fourth token "D" which may be valid from 10:03 AM to 10:04 AM. Step 304 may include generating decryption keys "A'" for token "A", "B'" for token "B", "C'", for token "C", and/or "D'" for token "D".

Still referring to FIG. 3, at step 310, method 300 includes capturing an image. An image may be captured through one or more image recording devices. An image may be captured at a specific location of an image recording device, such as, but not limited to, building entrances, residential locations, transportation hubs, public events, and/or other locations. An image may include a monochrome image, full color image, and/or infrared image. In some embodiments, an image may include depth data using a depth sensor.

Still referring to FIG. 3, at step 315, method 300 includes detecting face(s) within an image. A face may be detected using a machine learning process, such as a facial recognition process, as described above with reference to FIG. 1. Detecting a face may include generating one or more pixel maps and inputting the one or more pixel maps into a neural network. This step may be implemented as described above with reference to FIGS. 1-2.

Still referring to FIG. 3, at step 320, method 300 includes obscuring a face. Obscuring a face may include applying a mask layer around one or more faces of an image. A mask layer may include a color such as, but not limited to, green, white, black, red, blue, and the like. In some embodiments, obscuring a face may include pixelating one or more faces. Pixelation may include decreasing a resolution of a portion of an image including a face. Pixelation may generate a "blurry" effect around an entire face, eyes of a face, eyes and mouth of a face, and the like. Obscuring a face may include obscuring headwear around a face, such as, without limitation, hats, helmets, beanies, glasses, and the like. This step may be implemented as described above with reference to FIGS. 1-2, without limitation.

Still referring to FIG. 3, step 320 includes encrypting obscured faces. Encrypting obscured faces may include converting image data of the entire image or portions of the image from plaintext to ciphertext. Encrypting obscured faces may include encrypting a cropping of one or more obscured faces. Encryption may include generating both a time-sensitive key and a key unique to an image recording device that captured the encrypted image. Encrypted data may be embedded/injected into image data of the image, such as meta data of the image. This step may be implemented as described above with reference to FIGS. 1-2, without limitation.

Still referring to FIG. 3, step 325 includes decrypting an encrypted image. Decrypting an encrypted image may include providing a computing device with both a time-sensitive key and a key unique to an image recording device. Upon decryption, faces of an image may be revealed for a set period of time. In some embodiments, an audit record of a user decrypting an image may be record. An audit may include, but is not limited to, a record of an identifier of a device requesting decryption, a time period of decryption, a location of a device requesting decryption, and the like. This step may be implemented as described above with reference to FIGS. 1-2, without limitation.

Figure 4:
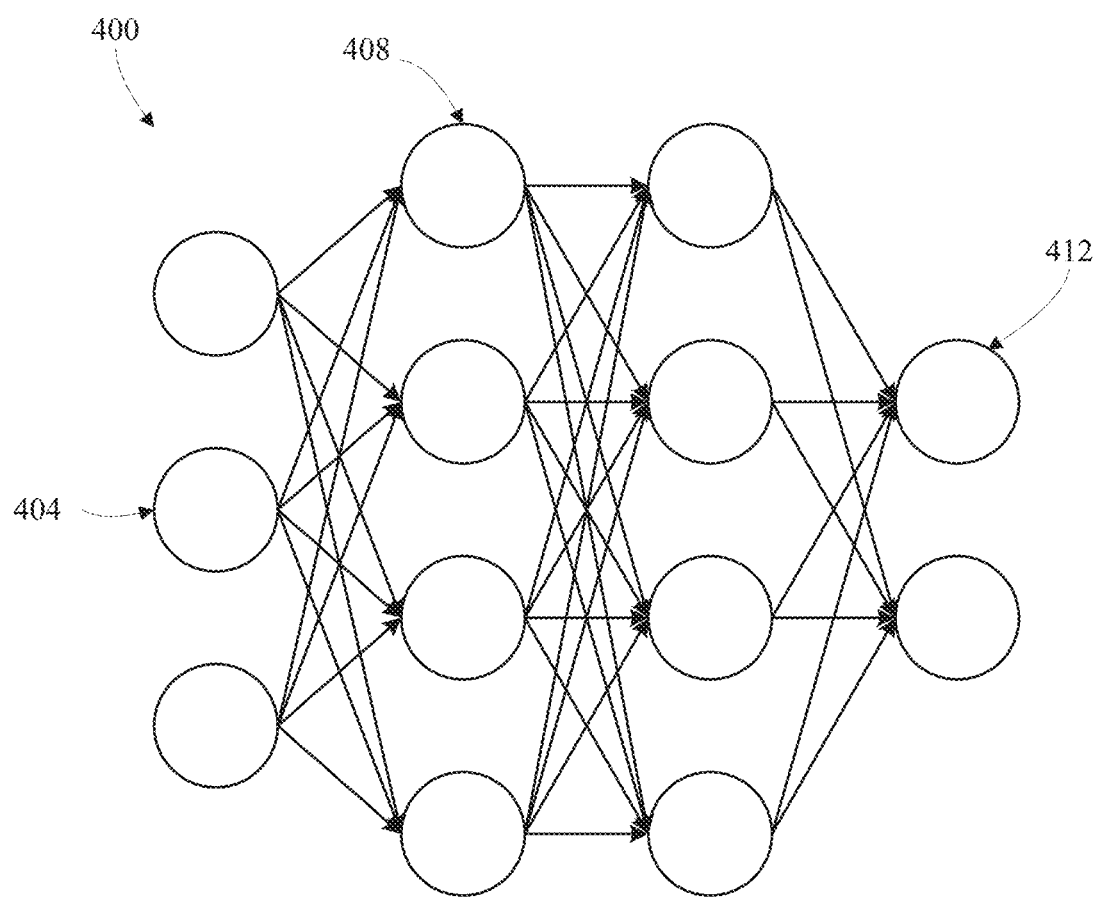
FIG. 4 illustrates an exemplary embodiment of a neural node.

Referring now to FIG. 4, a neural network is presented. A neural network as used in this disclosure is a data structure that is constructed and trained to recognize underlying relationships in a set of data through a process that mimics the way neurological tissue in nature, such as without limitation the human brain, operates. Neural network 400 includes a network of "nodes," or data structures having one or more inputs, one or more outputs, and functions determining outputs based on inputs. Such nodes may be organized in a network, such as without limitation a convolutional neural network (CNN). A network of nodes may include an input layer of nodes 404, one or more intermediate layers 408, and an output layer of nodes 412. Intermediate layers 408 may also be referred to as "hidden layers". Connections between nodes may be created via the process of "training" neural network 400, in which elements from a training dataset are applied to the input nodes. A suitable training algorithm, such as without limitation Levenberg-Marquardt, conjugate gradient, simulated annealing, and/or other algorithms may be used to adjust one or more connections and weights between nodes in adjacent layers, such as intermediate layers 408 of neural network 400, to produce desired values at output nodes 412. This process is sometimes referred to as deep learning.

Figure 5:
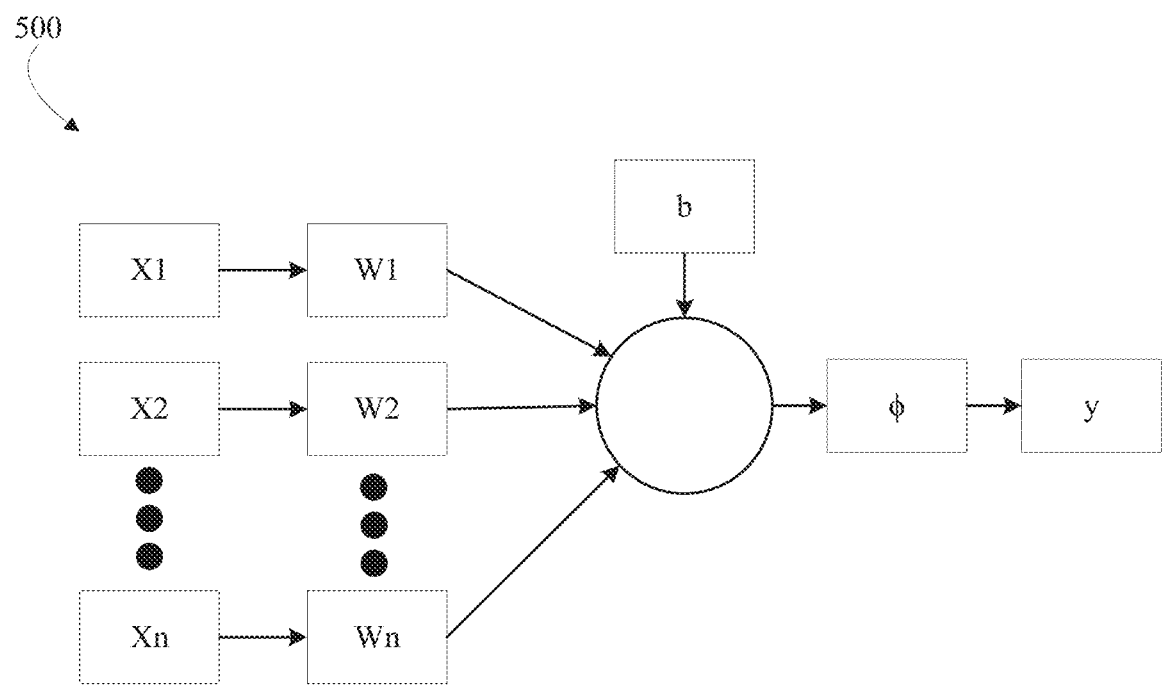
FIG. 5 illustrates an exemplary embodiment of a neural network.

Referring to FIG. 5, an exemplary neural network is shown where nodes may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
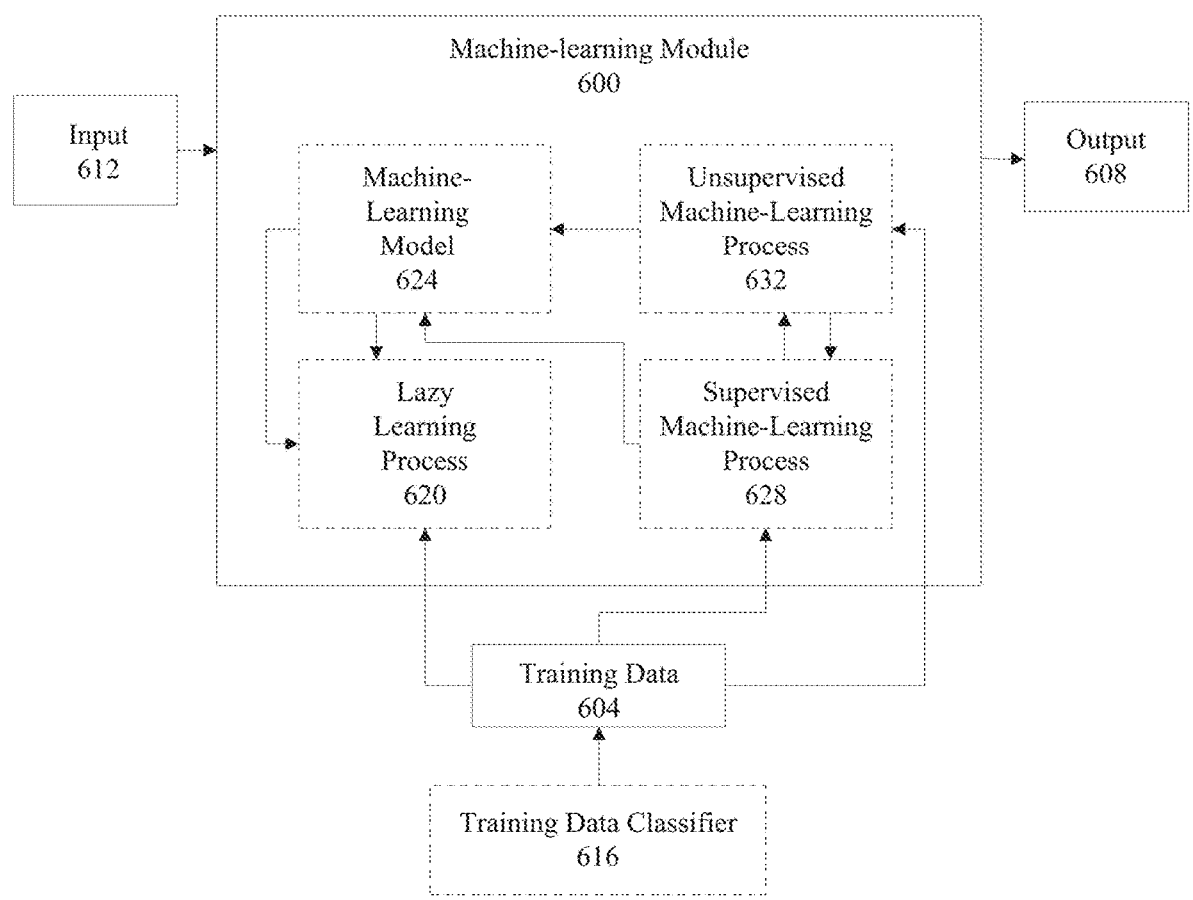
FIG. 6 illustrates a block diagram of a machine learning module that may be implemented throughout any system and/or method as described in this disclosure.

Referring to FIG. 6, an exemplary machine-learning module 600 may perform machine-learning process(es) and may be configured to perform various determinations, calculations, processes and the like as described in this disclosure using a machine-learning process.

Still referring to FIG. 6, machine learning module 600 may utilize training data 604. For instance, and without limitation, training data 604 may include a plurality of data entries, each entry representing a set of data elements that were recorded, received, and/or generated together. Training data 604 may include data elements that may be correlated by shared existence in a given data entry, by proximity in a given data entry, or the like. Multiple data entries in training data 604 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations. Correlations may indicate causative and/or predictive links between categories of data elements, which may be modeled as relationships such as mathematical relationships by machine-learning processes as described in further detail below. Training data 604 may be formatted and/or organized by categories of data elements. Training data 604 may, for instance, be organized by associating data elements with one or more descriptors corresponding to categories of data elements. As a non-limiting example, training data 604 may include data entered in standardized forms by one or more individuals, such that entry of a given data element in a given field in a form may be mapped to one or more descriptors of categories. Elements in training data 604 may be linked to descriptors of categories by tags, tokens, or other data elements. Training data 604 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 6, training data 604 may include one or more elements that are not categorized. Uncategorized data of training data 604 may include data that may not be formatted or containing descriptors for some elements of data. In some embodiments, machine-learning algorithms and/or other processes may sort training data 604 according to one or more categorizations. Machine-learning algorithms may sort training data 604 using, for instance, natural language processing algorithms, tokenization, detection of correlated values in raw data and the like. In some embodiments, categories of training data 604 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure, without limitation.

Further referring to FIG. 6, training data 604 may be filtered, sorted, and/or selected using one or more supervised and/or unsupervised machine-learning processes and/or models as described in further detail below. In some embodiments, training data 604 may be classified using training data classifier 616. Training data classifier 616 may include a classifier. A "classifier" as used in this disclosure is a machine-learning model that sorts inputs into one or more categories. Training data classifier 616 may utilize a mathematical model, neural net, or program generated by a machine learning algorithm. A machine learning algorithm of training data classifier 616 may include a classification algorithm. A "classification algorithm" as used in this disclosure is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine-learning module 600 may generate a classifier, such as training data classifier 616 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to one or more faces.

Still referring to FIG. 6, machine-learning module 600 may be configured to perform a lazy-learning process 620 which may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 6, machine-learning processes as described in this disclosure may be used to generate machine-learning models 624. A "machine-learning model" as used in this disclosure is a mathematical and/or algorithmic representation of a relationship between inputs and outputs, as generated using any machine-learning process including without limitation any process as described above, and stored in memory. For instance, an input may be sent to machine-learning model 624, which once created, may generate an output as a function of a relationship that was derived. For instance, and without limitation, a linear regression model, generated using a linear regression algorithm, may compute a linear combination of input data using coefficients derived during machine-learning processes to calculate an output. As a further non-limiting example, machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include supervised machine-learning process 628. A "supervised machine learning process" as used in this disclosure is one or more algorithms that receive labelled input data and generate outputs according to the labelled input data. For instance, supervised machine learning process 628 may include images as described above as inputs, cropped faces of images as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include unsupervised machine-learning processes 632. An "unsupervised machine-learning process" as used in this disclosure is a process that calculates relationships in one or more datasets without labelled training data. Unsupervised machine-learning process 632 may be free to discover any structure, relationship, and/or correlation provided in training data 604. Unsupervised machine-learning process 632 may not require a response variable. Unsupervised machine-learning process 632 may calculate patterns, inferences, correlations, and the like between two or more variables of training data 604. In some embodiments, unsupervised machine-learning process 632 may determine a degree of correlation between two or more elements of training data 604.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array), an ASIC (application specific integrated circuit), non von neumann architectures, neuromorphic chips, and deep learning chips.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system for image encryption, comprising:
a computing device in communication with the image recording device, wherein the computing device is configured to:
receive image data from an image recording device;
detect a human face in the image data as a function of a facial recognition process;
modify the image data to produce modified image data, wherein to modify the image data the computing device is further configured to:
generate a face crop image comprising substantially only the human face;
encrypt the face crop image using an encryption process, wherein keys of the encryption process include a first encryption key unique to the image recording device and a second encryption key unique to the face crop;
reversibly obscure only the face crop image separate from a background of the image data resulting in the modified image data comprising the obscured face crop image and unobscured background;
embed the encrypted data of the face crop image of the modified image data in meta data of the image data; and
communicate the modified image data to a remote computing device, wherein the modified image data is reversible to an original image of the image data upon decryption of the second encryption key.

2. The system of claim 1, wherein the computing device is further configured to:
receive a decryption key from the other computing device; and
reverse an obscurement of the face crop image.

3. The system of claim 2, wherein the computing device is further configured to generate an audit record of the reversing of the obscurement of the face crop image.

4. The system of claim 1, wherein the computing device is further configured to communicate keys of the encryption process with a key escrow.

5. The system of claim 1, wherein the computing device is further configured to initialize an image recording device in communication with the computing device through a camera provisioning process.

6. The system of claim 1, wherein the computing device is further configured to perform a monitoring process, wherein to perform the monitoring process the computing device is further configured to:
receive a redacted image from a device; and
communicate the redacted image to a user.

7. The system of claim 1, wherein the image recording device is one of a mobile computing device, a residential security camera, or a commercial security camera.

8. A method for image encryption, comprising:
receiving image data at a computing device from an image recording device;
detecting a human face in the image data, at the computing device, as a function of a facial recognition process;
modifying the image data, at the computing device, wherein modifying the image data comprises:
generating a face crop image comprising substantially only the human face;
encrypting the face crop image using an encryption process, wherein keys of the encryption process include a first encryption key unique to the image recording device and a second encryption key unique to the face crop;
reversibly obscuring only the face crop image from a background of the image data resulting in the modified image data comprising the obscured face crop image and unobscured background;
embedding the encrypted data of the face crop image of the modified image data in meta data of the image data; and
communicating the modified image data to a remote computing device, wherein the modified image data is reversible to an original image of the image data upon decryption of the second encryption key.

9. The method of claim 8, further comprising:
receiving, at the computing device, decryption keys; and
reversing an obscurement of the face crop image.

10. The method of claim 9, further comprising:
generating, at the computing device, an audit record of the reversing of the obscurement of the face crop image.

11. The method of claim 8, further comprising communicating with a key escrow to receive decryption keys specific to the face crop image.

12. The method of claim 8, wherein reversibly obscuring the face crop image includes pixelating the face crop image.

13. The method of claim 8, further comprising downsampling, by the facial recognition process, the image data into a value map.

14. The method of claim 8, further comprising initializing the image recording device through a camera provisioning process.

15. The method of claim 8, further comprising associating, by the image facial recognition process, an identity of an individual with the image data.

16. A system for image encryption, comprising:
a computing device in communication with the image recording device, wherein the computing device is configured to:
receive image data from an image recording device;
detect a human face in the image data as a function of a facial recognition process;
modify the image data to produce modified image data, wherein to modify the image data the computing device is further configured to:
generate a face crop image comprising substantially only the human face;

encrypt the face crop image using an encryption process, wherein keys of the encryption process include a first encryption key unique to the image recording device and a second encryption key unique to the face crop; and reversibly obscure only the face crop image separate from a background of the image data resulting in the modified image comprising the obscured face crop image and unobscured background;

embed the encrypted data of the face crop image of the modified image data in meta data of the image data;

communicate the modified image data to a remote computing device, wherein the face crop of the modified image data is reversible to an original image upon decryption of the second encryption key; and perform an interrogation process, wherein to perform the interrogation process the computing device is further configured to:

receive a request for an unredacted image for a specific time period from a user; and communicate with a key escrow to provide the user with the first and second encryption keys to access the unredacted image for a specific time period, wherein the key escrow stores an audit record of the request of the user.

* * * * *